(12) United States Patent
Baumüller et al.

(10) Patent No.: US 7,240,490 B2
(45) Date of Patent: Jul. 10, 2007

(54) TOOL ARRANGEMENT AND APPLICATION OF SAID TOOL ARRANGEMENT

(75) Inventors: Klaus Baumüller, Erlagen (DE); Otto Zeitler, Möhrendorf (DE); Christoff Lasaroff, Herzogenaurach (DE); Dietmar Lindner, Eckersdorf (DE)

(73) Assignee: Lukas Hydraulik GmbH, Erlangen (DE)

( * ) Notice: Subject to any disclaimer, the term of this patent is extended or adjusted under 35 U.S.C. 154(b) by 329 days.

(21) Appl. No.: 10/892,904

(22) Filed: Jul. 15, 2004

(65) Prior Publication Data
US 2005/0051014 A1 Mar. 10, 2005

(30) Foreign Application Priority Data
Jul. 17, 2003 (DE) .............................. 103 32 778

(51) Int. Cl.
*B26D 5/20* (2006.01)
*B26D 1/00* (2006.01)
*B66F 3/24* (2006.01)
(52) U.S. Cl. ....................................... 60/547.1; 60/560

(58) Field of Classification Search ................. 60/325, 60/547.1, 560, 563, 593
See application file for complete search history.

(56) References Cited

U.S. PATENT DOCUMENTS 3,837,076 A * 9/1974 Good, Jr. ................... 60/547.1
5,265,423 A * 11/1993 Glaser ......................... 60/560

FOREIGN PATENT DOCUMENTS

| DE | 42 17 121 C2 | | 2/1996 |
| DE | 692 21 221 T 2 | | 11/1997 |
| DE | 693 15 569 T 2 | | 3/1998 |
| GB | 2018365 A | * | 10/1979 |

* cited by examiner

Primary Examiner—Igor Kershteyn
(74) Attorney, Agent, or Firm—Merchant & Gould P.C.

(57) ABSTRACT

A tool arrangement includes a tool unit 2, e.g. a cutting apparatus 2', a spreader 2", a squeezing device or the like, and a drive 3, a control and/or switching clement, as well as a first operating-medium circuit 4, in which tool arrangement a second operating-medium circuit 5 is provided, which is actively connected to the first operating-medium circuit 7 by a pressurized-media converter 6.

19 Claims, 2 Drawing Sheets

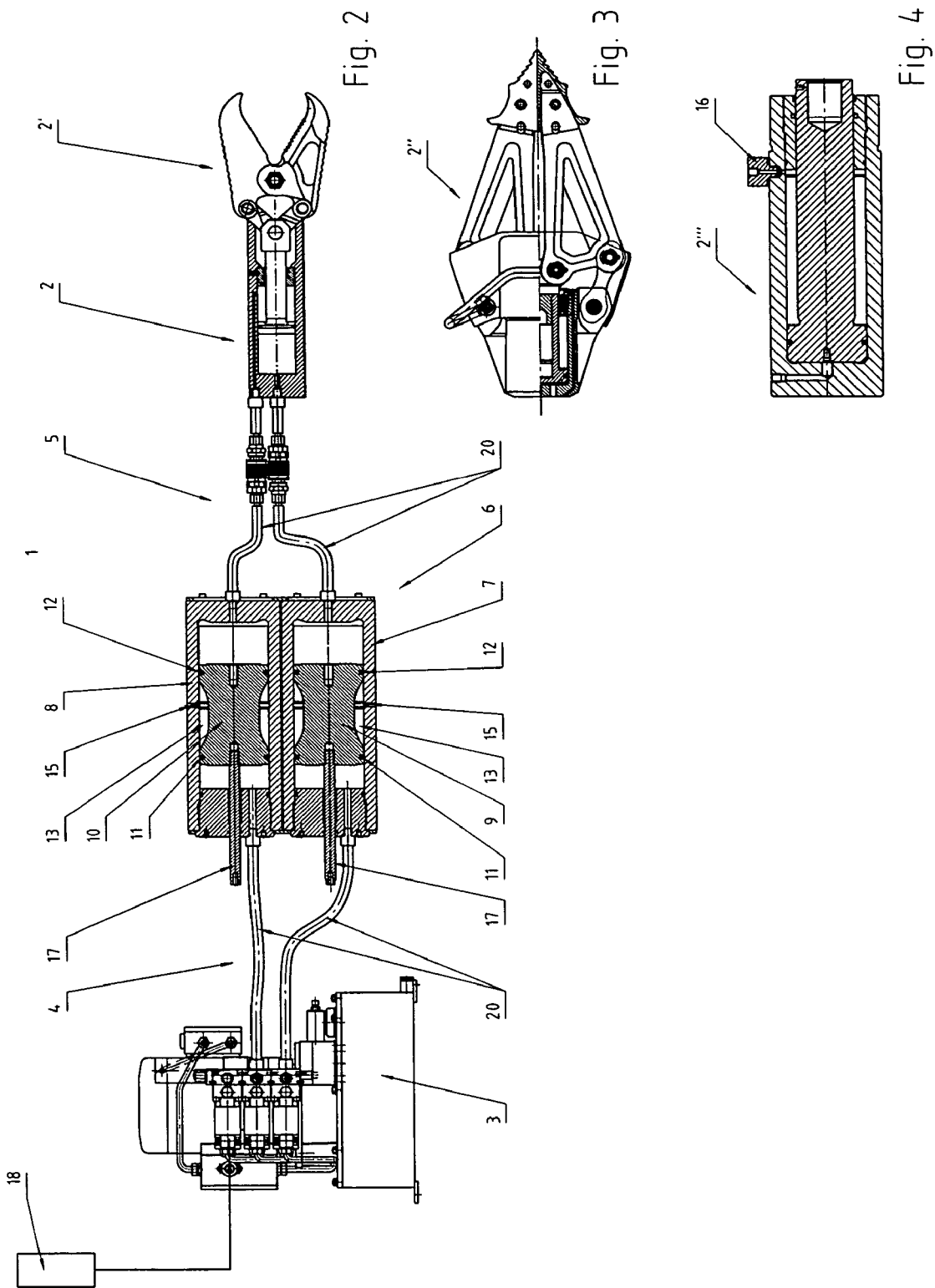

TOOL ARRANGEMENT AND APPLICATION OF SAID TOOL ARRANGEMENT

BACKGROUND OF THE INVENTION

1. Field of the Invention

The present invention relates to a tool arrangement with a tool unit, e.g. a cutting apparatus, a spreader, a squeezing device or the like, and with a control and/or switching element, a drive, as well as a first operating-medium circuit.

2. Description of the Prior Art

Tools that must transfer large forces, as for example cutting tools, squeezing devices, and the like, are known. Such tools are therefore frequently equipped with a hydraulic or pneumatic drive, which, for example, effects an opening and closing movement of a spreader or a shearing device.

A tool of this type results from, for example, DE 692 21 221 T2, which tool displays a hydraulic cylinder, the lifting rod of which actuates the actual tool, which is formed by two cutting edges or two arms. The hydraulic drive, in this particular case, is operated by means of a compressible fluid.

Hydraulic fluids are in most cases a matter of incompressible oils, due to the corrosive characteristics of water. However, the case can also arise in which a diminishing in size or processing of diverse parts must take place under water. Thus, for example, in nuclear power stations or reactors it is necessary to crush parts under water, because the space for storage of the irradiated material is to be kept as small as possible. In the case of a leak in the tool, all of the water, which here concerns in particular deionized water (deionate), must be purified, which is associated with high costs.

SUMMARY OF THE INVENTION

It is therefore the object of the present invention to create a tool by means of which activities can be carried out under water, whereby in the event of leaks in the tool no contamination of the water takes place.

According to the invention, the tool arrangement includes a second operating-medium circuit, which is connected to the first operating-medium circuit via a pressurized-media converter. Since two operating-medium circuits or two hydraulic or pneumatic units are provided, each of the operating-medium circuits can be operated with a different operating medium. This division of the operating-medium circuit leads to advantageous application possibilities of the tool arrangement. The first operating-medium circuit can advantageously be connected to the drive, especially a pump, and the second operating-medium circuit can be connected to the tool unit. The tool unit can be a matter of a cutting apparatus, a spreader, a hydraulic cylinder (e.g. for a press), or the like.

Through this means it is advantageously possible to work with the tool in a medium that corresponds to the operating medium assigned to the second operating-medium circuit. If a leakage occurs in the tool unit, the entire medium in which the work is being carried out need not be decontaminated, since the operating medium corresponds to this medium. The separation of the two operating-medium circuits has the additional advantage that no costly sealing measures must be provided on the tool unit, since a leakage causes no contamination of the medium in which the work is taking place.

Thus, the first operating-medium circuit can operated with a first operating medium and the second operating-medium circuit with a second operating medium, the first and the second operating media being different from each other. Accordingly, in each case the optimal operating medium for the tool and for the drive can be selected.

In particular, the first and the second operating media are in each case fluids by means of which a hydraulic drive and an associated large transfer of force can be carried out.

The second operating medium can be a matter of water, especially deionized water (deionate). Consequently, the tool can be used in nuclear power stations or nuclear reactors, where diverse parts must be processes under water, for example crushed or cut into small pieces. A leak in the tool does not lead to a contamination of the deionate and thus no elaborate and costly purification operation need be performed on the deionate.

Since the operation of the pump with water or deionate is very difficult due to the corrosive characteristic of the water, the cavitation danger, and the seal gaps on the piston unit, the drive, that is to say the pump, can be operated with a hydraulic fluid or hydraulic oil. In particular here it can be a matter of a conventional hydraulic medium, e.g. hydraulic oil or HFC fluid. A mixing of the two fluids through the intermediately-connected pressurized-media converter cannot occur.

Advantageously, the pressurized-media converter is a dividing-piston arrangement. In this case, the pressurized-media converter can display two cylinders, in which in each case a free piston, which separates the two operating media from each other, can be moved back and forth over a stroke path. The hydraulic energy of the first operating-medium circuit is directly transferred to the second operating-medium circuit.

Appropriately, the two cylinders are arranged parallel to each other, whereby a small structural size of the pressurized-media converter is achieved.

In order to exclude a mixing together of the two operating media, the free piston in each case can display at least two spaced-apart sealing elements that prevent a penetration of the operating medium at the boundary surface between free piston and cylinder. Appropriately, at least one sealing element can be arranged in the respective end region of the free piston, in order to prevent a penetration of the first as well as the second operating media from both sides.

Advantageously, the sealing elements can be arranged such that the sealing element on the side of the first operating-medium circuit does not sweep over the same path or the same surface as the sealing element on the side of the second operating-medium circuit, in order to prevent a mixing together of the different fluids. In this context, obviously more than one sealing element can be provided on each side of the free piston.

In addition, the free piston in each case can display a recess that is arranged between the sealing elements. This recess represents a collection space for the operating medium that penetrates despite the seals.

The recess is open in the direction of the cylinder shell and thus receives the operating medium penetrating into the boundary region between the free piston and the cylinder. The recess can advantageously extend over the entire circumference of the free piston, whereby it is ensured that any leakages enter the collection space. The recess can have a concave form in order to avoid stress peaks during the movement of the free piston.

The cylinder can display in each case at least one outlet whereby leaked media or so-called drag oil that presses through between the free piston and the cylinder wall can flow to the outside. Accordingly, the outlet is preferably located in the movement region of the free piston. If seals are provided in each case on the end regions of the free piston—as described above—then the outlet is arranged with advantage in the movement region of the free piston between the two seals. The outlet is provided not only so that leaked media or drag oil can flow off, but also to serve the ventilation of the cylinder interior, so that, for example, accumulated water can evaporate.

Advantageously, at least one outlet in the cylinder can be assigned to the recess. The outlet ensures that the leaked media accumulated in the recess can flow off to the outside.

Advantageously, during the back-and-forth movement of the free piston the recess is constantly in communication with the outlet, in order to ensure drainage of the leaked media at each position of the free piston.

In order to ensure that the free piston in each case does not reach its end position, in other words the working stroke is observed and can be controlled, a piston status indicator is provided for at least one free piston, preferably for each free piston. Such a piston status indicator can be connected with the respective free piston, in particular with its front side, and project outwardly from the cylinder, in particular from its front side. The stroke movement of the respective piston can thus be monitored from the outside in a simple manner.

The drive itself can be actuable or controllable by means of remote control, which is advantageous, for example, in the application of the tool arrangement in a nuclear reactor.

The lines between the pressurized-media converter and the drive, on the one hand, and between the pressurized-media converter and the tool, on the other hand, can if necessary have different lengths. In this case, it is of particular advantage that the lines between the pressurized-media converter and the tool can be formed very long, in order to reach with the tool the e.g. underwater application region, while at the same time the pressurized-media converter as well as the drive can remain outside the water.

According to the invention, the above described tool arrangement is used under water, e.g. in a nuclear reactor, for activities such as crushing, cutting to small pieces, cleanup work, or the like. Thus, for example, power control rods can be crushed under water without worry that a contamination of the water with hydraulic fluid can occur.

BRIEF DESCRIPTION OF THE DRAWINGS

The invention is explained in detail with reference to advantageous embodiment examples in the drawn figures. In the drawings:

FIG. 2 shows a sectional representation of a tool arrangement with a cutting apparatus;

FIG. 3 shows a sectional representation of a spreader; and

FIG. 4 shows a sectional representation of a hydraulic cylinder.

DETAILED DESCRIPTION OF THE PREFERRED EMBODIMENT

Figure 1:
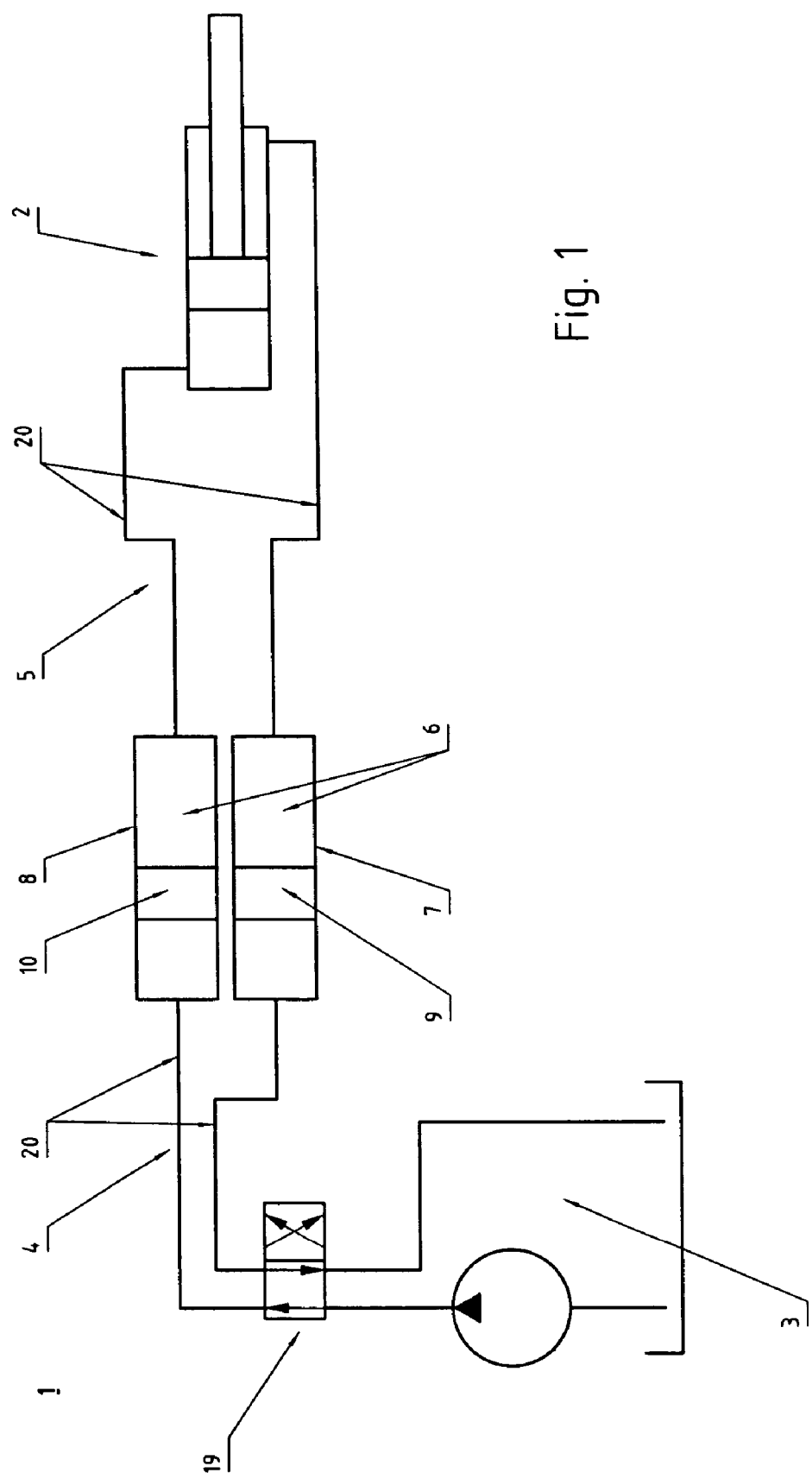
FIG. 1 shows a basic circuit diagram of a tool arrangement.

Reference numeral 1 indicates the tool arrangement in its entirety. The tool arrangement 1 comprises a tool unit 2 (in FIG. 2 this is a cutting apparatus 2'), a drive 3, a control and switching valve 19, and a first operating-medium circuit 4. Provided in addition is a second operating-medium circuit 5, which is connected to the first operating-medium circuit 4 via a pressurized-media converter 6. Thus, as a whole the tool arrangement 1 produces a closed circuit. The division of the hydraulic circuit into two operating-medium circuits leads to especially advantageous application possibilities of the tool 2, which is not directly dependent on the drive and the operating-medium circuit connected to the latter, nor on the operating medium necessary for this circuit.

Represented in FIGS. 3 and 4 are tools 2 that can be alternatively attached to the tool arrangement. Thus, instead of the cutting apparatus 2', either a spreader 2 (FIG. 3) or a hydraulic cylinder 2''', e.g. for a press, can be incorporated into the tool arrangement.

The first operating-medium circuit 4 is connected to the drive 3, and the second operating-medium circuit 5 to the tool unit 2. The first operating-medium circuit 4 is operated with a first operating medium and the second operating-medium circuit 5 with a second operating medium, the first and second operating media being different from each other. The second operating medium, which is in direct connection with the tool unit 2 via the second operating-medium circuit 5, is water, in particular deionized water, so-called dionate. The first operating medium is hydraulic oil or an HFC fluid or the like and reduces or prevents corrosion as well as cavitation on the side of the drive 3. Since the tool or rather the second operating-medium circuit 5 is operated only with water, the tool unit 2 can be used especially advantageously under water, without that danger that the medium water, more precisely the dionate, will be contaminated through leakages of the operating medium.

An especially advantageous use of the tool arrangement is the application in nuclear-power stations or nuclear reactors, in order to crush the irradiated material stored in a deionate. This is necessary because the space available for the storage of irradiated material is to be kept as small as possible.

The pressurized-media converter 6 is a dividing-piston arrangement, the details of which can be seen especially clearly in FIG. 2. The pressurized-media converter 6 displays two cylinders 7, 8, in each of which a free piston 9, 10 is arranged between the two operating-medium circuits 4, 5 and separate the two operating media from each other, the piston in each case being movable back and forth over a stroke path. This relatively simple structure ensures a direct transfer of the hydraulic forces from the one to the other operating-medium circuit, which transfer is associated with only small losses.

In order to construct the pressure-media converter 6 in as compact a manner as possible, the two cylinders 7, 8 are arranged parallel to each other.

The free pistons 9, 10 in each case display two sealing elements 11, 12 space apart from each other, which are intended to prevent a penetration of the liquid operating media from one operating-medium circuit to the other. The sealing elements 11, 12 are in each case arranged in the end region, thus near the ends of the respective free piston 9, 10. Here, the seals 11 do not sweep over the same surfaces as do the seals 12, so that a mixing of the different fluids of the two operating-medium circuits 4, 5 is prevented. In addition, the free pistons 9, 10 in each case display a recess 13 that is arranged between the sealing elements 11, 12. This recess 13 functions as a collecting basin for leaked media, in other words for the operating media that penetrate in each case between the free piston 9 or 10 and the cylinder 7 or 8, respectively, as well as at the respective sealing elements 11, 12. The recess 13 extends over the entire circumference of the free piston 9, 10 in order to reliably collect all leaked media and arrange the latter symmetrically around the free piston 9, 10.

The recess 13 has a concave form, which has both strength advantages and space advantages.

In order that the leaked media collected in the recess 13 can flow off, outlets 15 are arranged in the respective cylinder 7, 8 and assigned to the respective recess 13. In this way it is ensured that the recess 13 remains in contact with the outlets 15 during the back-and-forth movement of the free piston 9, 10, so that at each position of the free piston 9, 10 a flowing off of the leaked media is ensured. It is of course also possible to provide the cylinders 7, 8 with only outlets 15 and not the associated recesses. In this case likewise the outlet 15 is located in the movement region of the free piston 7, 8 and appropriately between the two seals 11, 12.

In order to be able to control the positioning or rather the end position of the free piston 9, 10, the pressurized-media converter 6 displays a piston status indicator 17. In the present example, this consists of pins that are connected to the end face of the respective free piston 9, 10 and project outwardly from the respective cylinder 7, 8, thus moving along with the free piston 9, 10.

The drive 3 is actuable and controllable via a remote control 18, which is of particular advantage in the use of the tool arrangement in a nuclear power station or nuclear reactor.

Reference numeral 16 indicates a safety valve on the hydraulic cylinder 2''' according to FIG. 4. Such a safety valve can of course also be provided in the case of the other tools.

The lines 20 between the pressurized-media converter 6 and the drive 3, on the one hand, and the tool unit 2, on the other hand, can have different lengths as required. In particular, the lines 20 between the tool unit 2 and the pressurized-media converter 6 are very long, in order allow the tool unit to be flexibly used under water, while simultaneously the pressurized-media converter 6 and the drive 3 are positioned out of the water.

REFERENCE NUMERAL LIST

1 Tool arrangement
2 Tool unit
2' Cutting apparatus
2" Spreader
2''' Hydraulic cylinder
3 Drive
4 First operating-medium circuit
5 Second operating-medium circuit
6 Pressurized-media converter
7 Cylinder
8 Cylinder
9 Free piston
10 Free piston
11 Sealing element
12 Sealing element
13 Recess
14 Cylinder shell
15 Outlet
16 Safety valve
17 Piston status indicator
18 Remote control
19 Control and switching valve
20 Line

The invention claimed is:

1. Tool arrangement comprising:
   a tool unit,
   a drive,
   a control and/or switching element,
   a first operating-medium circuit,
   a second operating-medium circuit actively connected to the first operating-medium circuit by a pressurized-media converter;
   wherein the pressurized-media converter comprises two cylinders connected in parallel in each of which a free piston separates the two operating media from each other, wherein each free piston is movable back and forth along a stroke path, and wherein a piston status indicator is provided at least one free piston.

2. Tool arrangement according to claim 1, wherein the first operating-medium circuit is connected to the drive and the second operating-medium circuit is connected to the tool unit.

3. Tool arrangement according to wherein the first operating-medium circuit is operated with a first operating medium and the second operating-medium circuit is operated with a second operating medium, the first and the second operating media being different from each other.

4. Tool arrangement according to claim 3, wherein the first and the second operating media are fluids.

5. Tool arrangement according to claim 3, wherein the second operating medium is water.

6. Tool arrangement according to claim 3 wherein the first operating medium is hydraulic oil or HFC fluid.

7. Tool arrangement according to claim 1, wherein the pressurized-media converter is a dividing-piston arrangement.

8. Tool arrangement according to claim 7, wherein the two cylinders are at-ranged parallel to each other.

9. Tool arrangement according to claim 1, wherein each of the free pistons comprises at least two sealing elements spaced apart from each other.

10. Tool arrangement according to claim 9, wherein am least one sealing element is arranged in the end region of each of the free pistons.

11. Tool arrangement according to claim 9, wherein each of the free pistons comprises at least one recess that is arranged between the sealing elements.

12. Tool arrangement according to claim 11, wherein the recess is open toward the cylinder shell.

13. Tool arrangement according to claim 11, wherein the recess extends over the entire circumference of each of the free pistons.

14. Tool arrangement according to claim 11, wherein the recess is concave.

15. Tool arrangement according to claim 1, wherein each of the cylinders comprises at least one outlet.

16. Tool arrangement according to claim 11, wherein the recess is assigned at least one outlet in one of the cylinders.

17. Tool arrangement according to claim 16, wherein the recess remains in contact with the outlet during the back-and-forth movement of the free piston.

18. Tool arrangement according to claim 1, wherein the drive is actuatable and/or controllable by means of a remote control.

19. Application of the tool arrangement according to claim 1 for crushing or cutting into small pieces ,under water.

* * * * *